Patented May 19, 1931

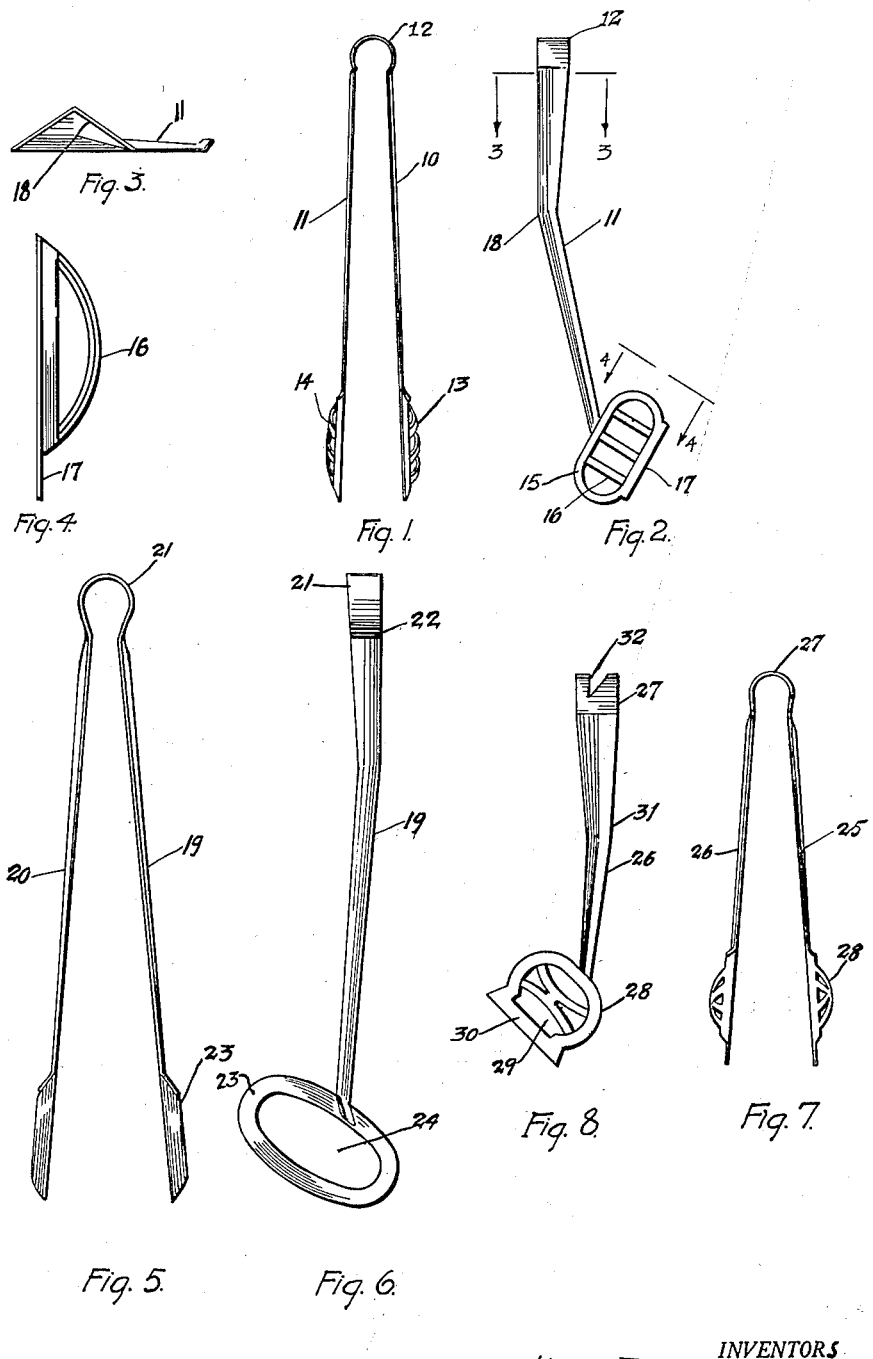

1,806,441

UNITED STATES PATENT OFFICE

KARL BAUER AND EUGEN KADE, OF BRONX, NEW YORK

UNIVERSAL KITCHEN TONG

Application filed March 27, 1930. Serial No. 439,382.

This invention relates to improvements in kitchen utensils and particularly to a pair of universal kitchen tongs, and it is the principal object of our invention to provide a utensil or implement of this character allowing a ready removal of articles of food from a boiling pot and even the moving of smaller pots or vessels without endangering the hands and arms to become injured or scalded.

Another object of our invention is the provision of an implement, preferably made from elastic metal or other material impervious to fire, of simple construction and therefore inexpensive to manufacture, yet durable and efficient in operation.

A further object of our invention is the provision of a pair of tongs equipped with gripping members adapted to securely grip and held an article upon their closure about the same, while simultaneously allowing a dripping off of the water adhering to articles to be removed from a boiling pot.

A still further object of our invention is the provision of a pair of tongs having combined therewith a bottle opener or cap remover.

Further objects of our invention are the provision of a pair of tongs equipped with gripper-members, which are arranged at a suitable angle to the implement proper and its branches, to ensure a firm grip and which are substantially bowl shaped to present a firm seat to the article handled by the tongs, while enlarged lips on the gripper members allow a firm gripping of the upper margin of pots and vessels for moving the same on a hot stove.

These and other objects and advantages of our invention will become more fully known as the description thereof proceeds, and will then be specifically defined in the appended claim.

In the accompanying drawings, forming a material part of this disclosure:

Fig. 1 is a front elevation of an implement constructed according to our invention.

Fig. 2 is an inner view of one of the shanks of the implement.

Fig. 3 is an end view of one of the gripping members seen in the direction of arrows 3—3 of Figure 2.

Fig. 4 is an end view of one of the head pieces or gripper members.

Fig. 5 is a front elevation of a modified form of our device.

Fig. 6 is an inner view of the shanks of the implement, Figure 5.

Fig. 7 is a front elevation of a further modification of our device.

Fig. 8 is an inner view of one of the branches or shanks of the implement, Figure 7.

As illustrated, the implement, which we may call universal kitchen tongs, comprises a preferably metal blank bent upon itself to form elastic parallel shanks or branches 10 and 11 connected at the center of the blank by an integral loop 12 substantially formed on the arc of a circle.

The outer ends of the branches are formed into two oppositely disposed gripping members 13 and 14 respectively arranged at an angle to the branches or shanks.

Each of the members 13 and 14 is composed of a substantially elliptical frame 15 bent laterally out of the plane of the shanks so as to present substantially bowl-shape gripping members, and the side bars of the frame are connected by a plurality of spaced bars 16 to form a grating, while the outer bar is formed into a somewhat wider lip 17.

The shanks are substantially V-shaped in cross-section as indicated at 18, and are formed with a knee 18'.

In the modified form of our invention illustrated in Figures 5 and 6 the branches 19, 20 are made also from a blank bent upon itself in its center to form a loop 21 forming shoulders 22.

The gripper members 23 at the ends of the branches or shanks 19, 20, are each arranged at an angle to the respective branch, and are formed elliptically with a median opening 24 and bent laterally out of the plane of the branches so as to form a dish or bowl with its bottom cut out to form the opening.

The modification illustrated in Figures 7 and 8 is formed from a somewhat shorter blank than those used in forming the forms of our implement illustrated in Figures 1 to 6.

The blank is bent upon itself at the center to form shanks or branches 25, 26, connected by a loop 27 integral with the branches.

The gripper members 28 also arranged at an angle to the lower ends of the branches are each formed to present a substantially elliptical frame having a median opening 29 in which bars are formed having substantially the form of the letter H to constitute a grate while the outer frame bar is formed into a comparatively wide lip 30.

Also in this form the gripper members are substantially bowl-shaped i. e. bent out of the plane of the branches which are formed with an intermediate knee 31, and are substantially V-shaped in cross-section.

The material of the loop 27 is preferably notched, as at 32, to present a means for removing caps from bottles or the like.

The operation of our novel and improved kitchen tongs will be entirely clear from the above description by simultaneous inspection of the drawings, and it will be evident that by pressing the shanks or branches of the tongs together, their gripping members will close about an egg, meat, potatoes, sauerkraut, etc., and allow the removal thereof from a pot, without endangering the hands and arms of a person manipulating the tongs to become scalded or burnt as the hands and arms will at all times be out of the path of the steam arising from a boiling pot or kettle.

The bowl shape of the grate-like gripping members will present a firm seat for the article and at the same time allow the hot water adhering to the article to be handled to drip off into the vessel, while the notch in one of the tongs will allow their use as a cap remover to open capped bottles or the like, and the somewhat enlarged outer lips of the gripping members will permit a firm gripping of the upper edges or margins of hot pots or vessels of reasonable size if it is desired to move the same protecting the operator against the heat.

It will be understood that we have described and shown the preferred forms of our device as some examples of the many possible ways to practically construct the same and that we may make such changes in its general arrangement and in the construction of the minor details thereof as come within the scope of the appended claim without departure from the spirit of our invention, and the principles involved.

Having thus described our invention, what we claim as new and desire to secure by Letters Patent is:

In a pair of universal kitchen tongs, a pair of parallelled spring shanks of substantial V-shape in cross-section, a knee formed intermediate the ends of said shanks, an integral loop formed with the shanks, and lower gripper-members at the ends of said shanks angularly disposed thereto, each of said members substantially elliptical and bowl-shaped and having an opening in its center to present a seat for an article to be lifted from a boiling pot.

Signed at New York, in the county of New York, and State of New York, this 26th day of March, A. D. 1930.

KARL BAUER.
EUGEN KADE.